United States Patent [19]
Bohannon

[11] Patent Number: 5,299,039
[45] Date of Patent: Mar. 29, 1994

[54] STACKED DISPLAY PANEL CONSTRUCTION AND METHOD OF ALIGNING PIXEL ELEMENTS THEREOF

[75] Inventor: William K. Bohannon, San Diego, Calif.

[73] Assignee: Proxima Corporation, San Diego, Calif.

[21] Appl. No.: 667,039

[22] Filed: Mar. 8, 1991

Related U.S. Application Data

[63] Continuation-in-part of Ser. No. 546,238, Jun. 29, 1990, abandoned, which is a continuation-in-part of Ser. No. 506,429, Apr. 9, 1990, abandoned, which is a continuation-in-part of Ser. No. 506,621, Apr. 9, 1990, Pat. No. 5,089,810, which is a continuation-in-part of Ser. No. 472,668, Jan. 30, 1990, abandoned, which is a continuation-in-part of Ser. No. 222,144, Jul. 21, 1988, abandoned.

[51] Int. Cl.[5] .................. G09G 3/36; G02F 1/133
[52] U.S. Cl. ............................... 359/53; 359/40; 359/55; 359/85; 340/784; 345/87
[58] Field of Search ............. 359/48, 53, 54, 55, 359/87; 340/784; 353/122

[56] References Cited

U.S. PATENT DOCUMENTS

| 3,982,239 | 9/1976 | Sherr | 359/53 |
|---|---|---|---|
| 4,110,794 | 8/1978 | Lester et al. | 359/53 |
| 4,824,212 | 4/1989 | Taniguchi | 359/55 |
| 4,917,465 | 4/1990 | Conner et al. | 359/53 |
| 4,944,578 | 7/1990 | Denison | 359/63 |
| 4,952,036 | 8/1990 | Gulick et al. | 359/48 |
| 4,962,376 | 10/1990 | Inoue et al. | 359/54 |
| 4,966,441 | 10/1990 | Conner | 359/53 |
| 4,998,099 | 3/1991 | Ishii | 359/54 |

FOREIGN PATENT DOCUMENTS 0114824 5/1989 Japan ................ 359/53

*Primary Examiner*—William L. Sikes
*Assistant Examiner*—Tai V. Duong
*Attorney, Agent, or Firm*—Bernard L. Kleinke; Jerry R. Potts

[57] ABSTRACT

A stacked liquid crystal display panel construction and method of aligning its pixel elements includes a liquid crystal panel assembly having a plurality of programmable controlled pixel elements for adjusting the relative position of a light image transmitted by the assembly. The pixel elements are controlled programmably by a image control unit that enables the addressing of the pixel elements to be selectively shifted for aligning optically pixels and for causing the display image transmitted by the panel assembly to be scrolled.

17 Claims, 5 Drawing Sheets

STACKED DISPLAY PANEL CONSTRUCTION AND METHOD OF ALIGNING PIXEL ELEMENTS THEREOF

CROSS REFERENCE TO RELATED APPLICATIONS

The present invention is a continuation in part of copending U.S. patent application Ser. No. 07/546,238, filed Jun. 29, 1990, entitled "STACKED DISPLAY PANEL CONSTRUCTION AND METHOD OF MAKING SAME," now abandoned which is a continuation-in-part of U.S. patent application Ser. No. 07/506,429, filed Apr. 9, 1990, entitled "STACKED DISPLAY PANEL CONSTRUCTION AND METHOD OF MAKING SAME", now abandoned which is a continuation-in-part of U.S. patent application Ser. No. 07/506,621, filed Apr. 9, 1990, entitled "STACKED DISPLAY PANEL CONSTRUCTION AND METHOD OF MAKING SAME", now U.S. Pat. No. 5,089,810, which is a continuation-in-part of U.S. patent application Ser. No. 07/472,668, filed Jan. 30, 1990, entitled "LIQUID CRYSTAL DISPLAY PANEL SYSTEM AND METHOD OF USING SAME," now abandoned which is a continuation-in-part of U.S. patent application Ser. No. 07/222,144, filed Jul. 21, 1988, entitled "GRAY SCALE SYSTEM FOR VISUAL DISPLAYS", now abandoned. The foregoing patent applications are incorporated herein by reference.

DESCRIPTION

1. Technical Field

The present invention relates in general to a stacked display panel construction and a method of aligning its pixel elements. More particularly, the present invention relates to a stacked liquid crystal display construction of an improved optical performance, for use with overhead projectors.

2. Background Art

Projection liquid crystal display systems have been well known for many years. Such systems generally include a liquid crystal display assembly driven by a suitable computer, such as a personal computer, and adapted to be positioned on the platform stage of a conventional overhead projector. Thus, computer generated images can be projected onto a screen for viewing by a group of people.

Such projectors typically include a light source and a Fresnel lens arrangement under the platform stage, to direct light beams convergingly upwardly toward and onto a projection lens assembly mounted directly above the stage to redirect and focus the computer generated image onto a remotely spaced screen, or a like viewing surface.

When using such an overhead projector, it is important for the purpose of producing a clear, sharp projected image, to direct the light from the overhead projector, entering the liquid crystal display assembly, uniformly across the face of the display assembly. Failure to direct the light uniformly can result in a less than satisfactory projected image. Moreover, if a plurality of overlying stacked liquid crystal display panels are used in the display assembly for full color displays, a parallax problem may result, if the light from the overhead projector does not pass uniformly through the aligned corresponding set of pixel elements disposed in the stacked panels. In this regard, the corresponding pixel elements in the overlying panels, must be properly optically aligned to provide a multiple color image. In this regard, each panel, together with its associated polarizers, can produce a different color, and the colors of the stacked panels can be added or subtracted to produce a desired color. Thus, the pixel elements must be properly aligned with the incoming light, to achieve the desired combined color image.

One solution for solving the above mentioned problem when using an overhead projector with a liquid crystal display assembly, has been to interpose the display panel assembly between a pair of Fresnel lens. The bottom or input Fresnel lens causes the light emerging from the overhead projector to be collimated so that the light passes uniformly through the liquid crystal panels disposed within the assembly in a parallel manner. Thus, the light directed along parallel light path to pass through the aligned pixel elements of the stacked panels. Thus, a clear image results. The top or output Fresnel lens causes the light beams emerging from the liquid crystal panel assembly to converge onto the projection lens assembly of the overhead projector.

While such a corrective lens arrangement has solved the aforementioned problems, such an arrangement has proven to be less than satisfactory, because the Fresnel lenses are costly, and it is expensive and time consuming to mount the lenses to the panels. Also, the lenses often times introduce unwanted and undesirable optical problems, such as distortion and optical losses.

Therefore, it would be highly desirable to have a new and improved stacked display panel construction, which eliminates entirely the need for light directing elements, such as Fresnel lenses or the like. In this regard, such a new display panel construction should be less expensive to manufacture, by eliminating the need for optically imperfect elements, while being able to function in a highly desirable manner when positioned on an overhead projector stage. Such a display panel construction should not only be relatively inexpensive to manufacture, but also it should enable the construction to be used in an acceptable manner on many different types and kinds of overhead projectors

DISCLOSURE OF INVENTION

Therefore, it is the principal object of the present invention to provide a new and improved display panel construction and method of aligning its pixel elements, to enable the construction to be used with an overhead projector without the need to use Fresnel lenses or other such elements to help direct light through the construction, and yet produce a highly satisfactory displayed image.

Another object of the present invention is to provide such a new and improved display panel construction, and method of aligning its pixel elements to achieve desirable optical characteristics, and to enable the construction to be manufactured according to modern mass production techniques.

Still yet another object of the present invention is to provide such a new and improved display panel construction, and method of making it, with substantial optical characteristics that may be easily and conveniently adjusted by a user for using the display construction with a variety of different types and kinds of overhead projector units.

Briefly, the above and further objects of the present invention are realized by providing a stacked liquid crystal display panel construction, and a method of aligning its pixel elements, having a plurality of liquid crystal panel units each having a plurality of programmable controlled liquid crystal pixel elements for adjusting the relative position of a light image transmitted by the assembly. The pixel elements in each panel unit are controlled programmably by an image control unit that enables the addressing of the pixel elements in each respective panel to be selectively shifted for optically aligning pixels and for causing the display image transmitted by the panel assembly to be scrolled.

The method of using the display panel construction includes controlling the image position transmitted by each panel assembly until the individual panel images merge to form a single image for projection purposes. Such a technique does not require the utilization of Fresnel lens due to the wide tolerances in controlling the image positions of the individual panels relative to one another.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
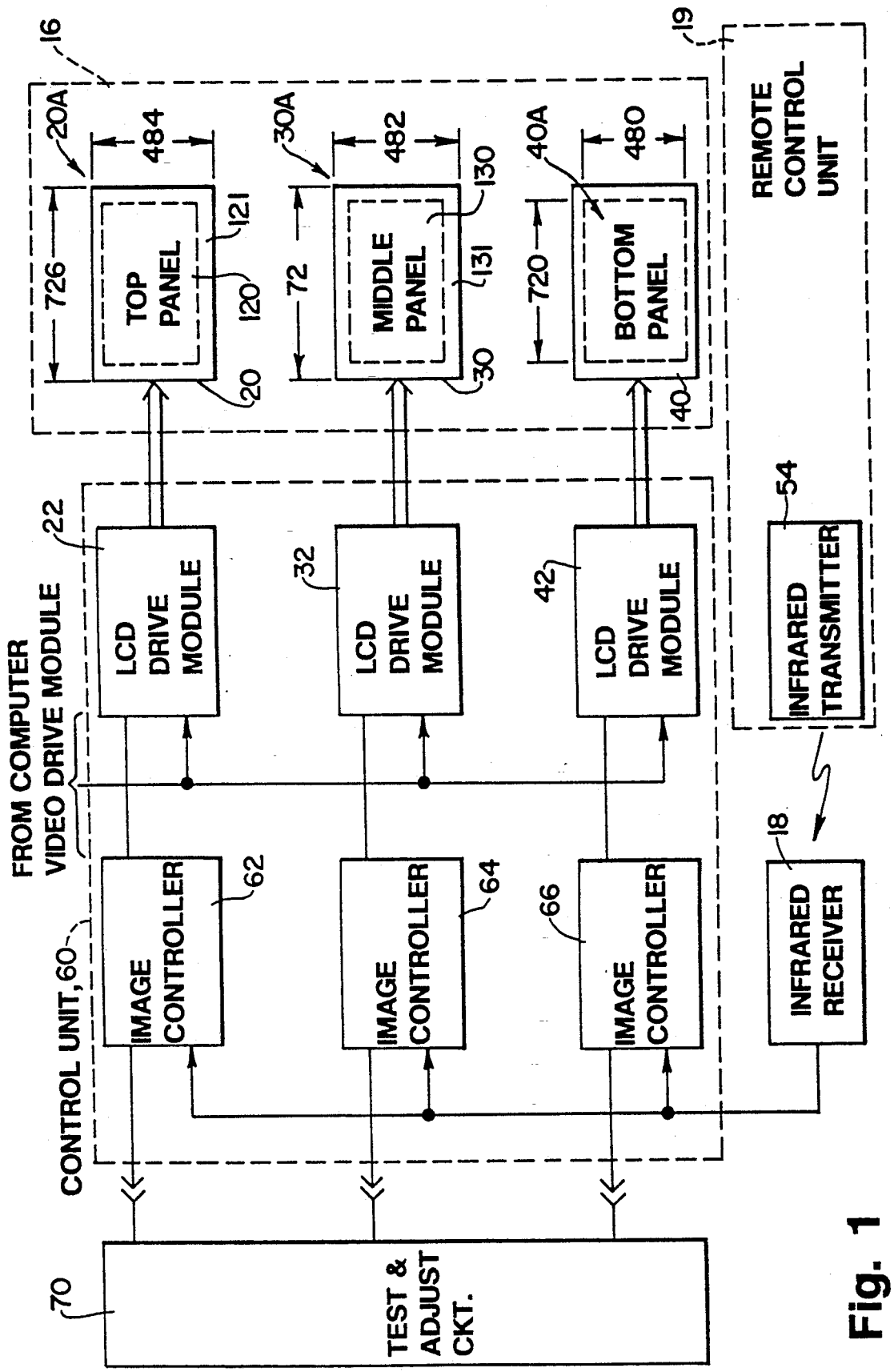
FIG. 1 is a diagrammatic block diagram of a panel construction, which is constructed in accordance with the present invention.
Figure 2:
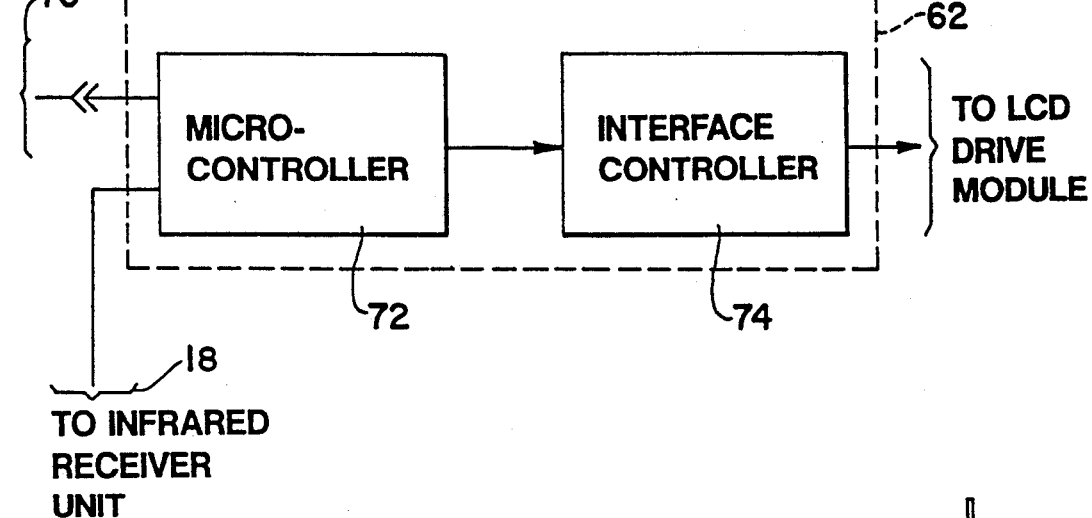
FIG. 2 is a diagrammatic block diagram of an image controller of the panel construction of FIG. 1.
Figure 3:
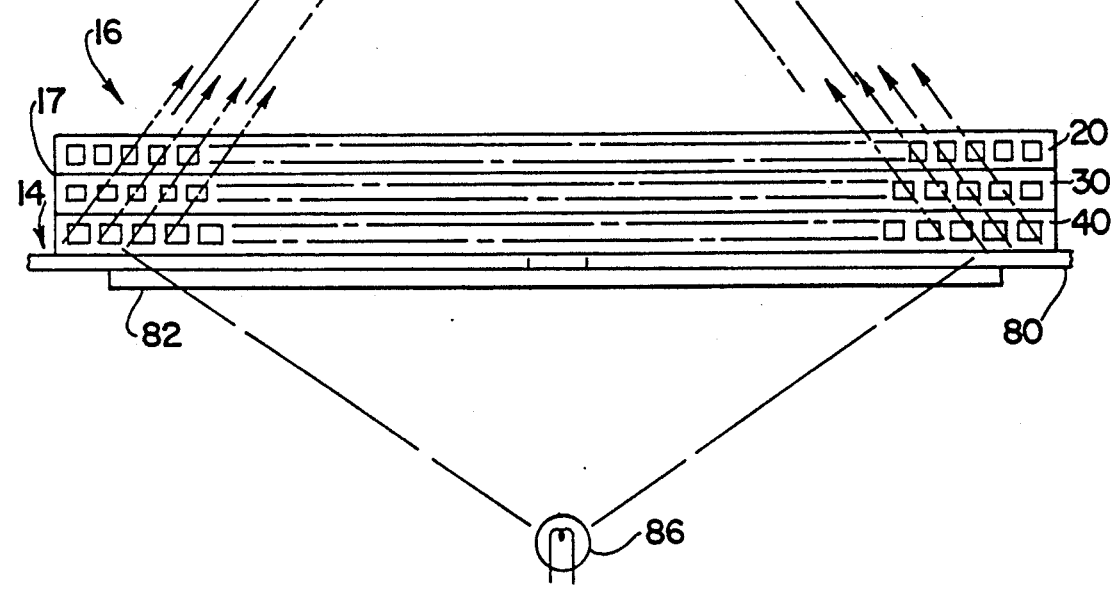
FIG. 3 is a diagrammatic view of the display panel construction of FIG. 1 and which is illustrated positioned on the platform stage of an overhead projector.

Referring now to the drawings, and more particularly to FIGS. 1 and 2 thereof, there is shown a panel construction 10 which is constructed in accordance with the present invention and which is adapted for use with an overhead projector 14 (FIG. 3). Such projectors typically include a stage or transparent projection surface 80 disposed between a Fresnel lens 82 and a projection lens assembly 84. In this regard, the Fresnel lens 82 causes light produced by a light source 86 mounted below the stage 80 to converge onto a lens 88 disposed in projection lens assembly 82.

Figure 4:
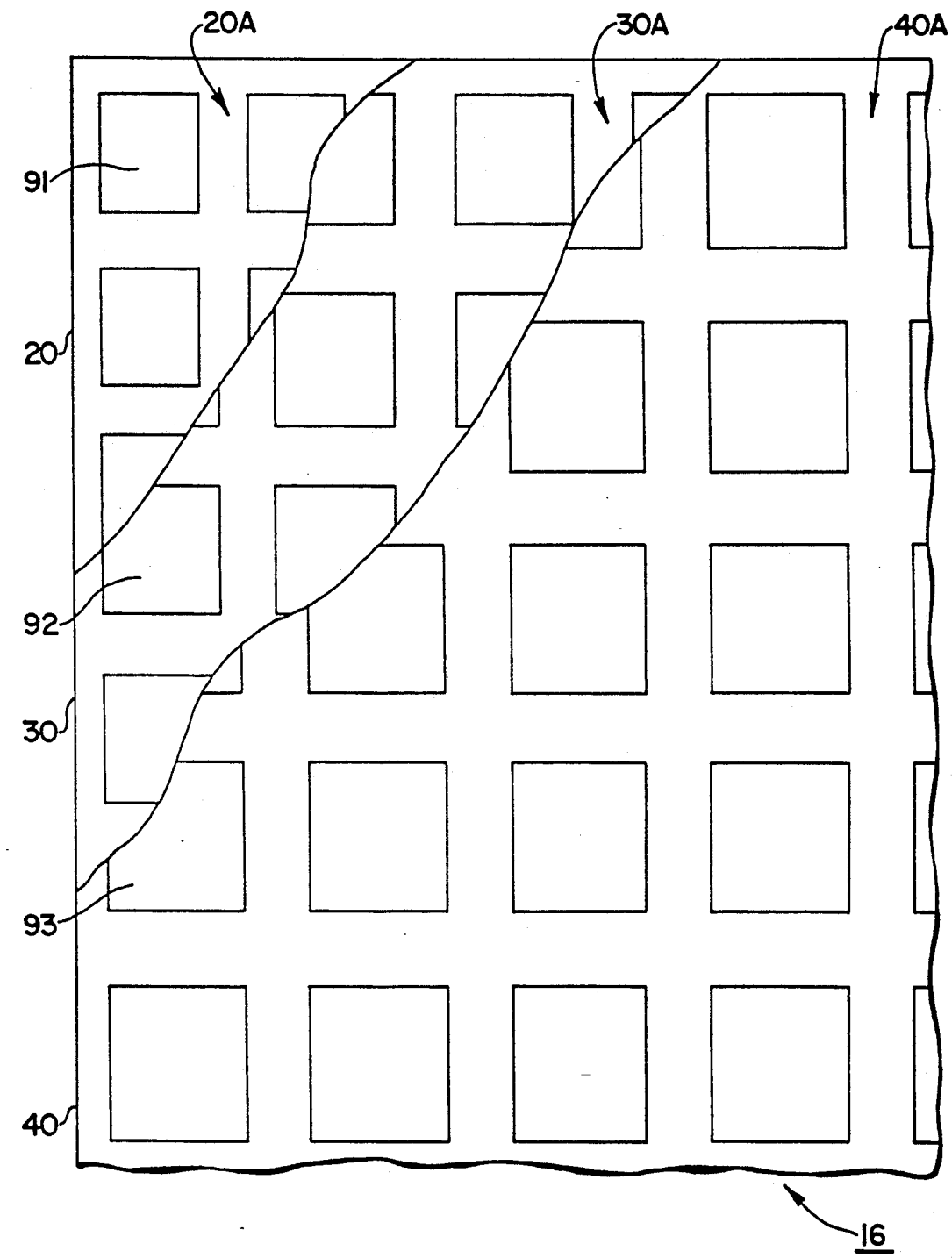
FIG. 4 is a greatly enlarged cut away diagrammatic view of the display panel construction of FIG. 1, illustrating the liquid crystal pixel elements in the panel construction.

As best seen in FIGS. 1, 3 and 4, the panel construction 10 generally comprises an arrangement consisting of an image control unit 60 coupled to a display assembly 16 having a set of stacked liquid crystal panel units including a top liquid crystal panel unit 20, an intermediate liquid crystal panel unit 30, and a base liquid crystal panel unit 40. Each of the panel units 20, 30 and 40 respectively are mounted in a housing 17 adapted to be positioned on the stage 80 of the overhead projector 14 and forming part of the display assembly 16.

As will be explained hereinafter in greater detail, the panel unit 20, 30 and 40 respectively each has a group of liquid crystal pixel elements, such as the liquid crystal pixel element 91, 92 and 93 respectively. The groups of pixel elements in the panel units 20, 30 and 40 are arranged in a set of arrays 20A, 30A and 40A respectively. For the purpose of enabling the converging light emerging from the Fresnel lens 82 of the overhead projector 14 to simultaneously illuminate a corresponding full pixel array in each of the panel units 20, 30 and 40 respectively, the pixel element arrays 20A, 30A and 40A are configured differently. In this regard, the top panel 20 has a top pixel array of 726×484 liquid crystal pixel elements; the intermediate panel 30 has an intermediate pixel array of 724×482 liquid crystal pixel elements; and the base panel 40 has a base pixel array of 720×480 liquid crystal pixel element. From the foregoing it should be understood that the top panel 20 has a larger number of liquid crystal pixel elements than the intermediate panel 30, and the intermediate panel 30 has a larger number of liquid crystal pixel elements than the bottom or base liquid crystal panel 40. Thus, the corresponding individual liquid crystal pixel elements between panels 20, 30 and 40 are staggered and aligned along a certain angular axis.

For the purpose of permitting the user/technician to adjust the position of the image produced by the panel construction 10 for scrolling purposes, a remotely controlled image position unit 19 is adapted to send coded infrared signals indicative of mode operation and image positioning information to the image control unit 60. In this regard, the panel construction 10 also includes an infrared receiver 18, that is electrically connected to the image control unit 60, and that is adapted to receive infrared signals from an infrared transmitter 54 disposed within the image position unit 19.

For the purpose of enabling corresponding liquid crystal pixel elements associated with panels 20, 30 and 40 respectively to be aligned along an angular axis for illumination purposes, a test and adjustment circuit 70 is adapted to be connected to the image control circuit 60 by the user/technician (not shown). The test and alignment circuit 70 consists of a set of switches and encoding circuits for generating certain signals utilized by the image control circuit 60. As the switches and encoding features of the alignment circuit 70 are substantially identical to the switches and encoding features of the position unit 19 the circuit 70 will not be described hereinafter in greater detail.

In operation a user positions the panel construction 10 on the stage 80 of the overhead projector 14 and couples the image control unit 60 to the video drive module of a personal computer (not shown). The user then causes a test pattern to be generated by the personal computer which is reproduced by panels 20, 30 and 40 respectively and projected onto a viewing surface or screen 50 by the overhead projector 14. The user/technician then observes the image displayed on screen 50 for any optical misalignments. If such misalignments are observed the user/technician depresses an appropriate control switch (not shown) disposed on the test and adjustment circuit 70 to generate a code which enables the liquid crystal pixel element array 30A of the intermediate panel 30 to be aligned with the base liquid crystal pixel element array 40A of the base panel 40. The user then depresses individual ones of a set of various alignment keys (not shown) on the test and adjust circuit 70 to align the pixel element array 30A with the base pixel element array 40A. Once the pixel elements of the intermediate panel 30 have been aligned with the pixel elements of the base panel 40, the user then presses another control key (not shown) disposed in the adjust and test circuit 70 that causes the alignment coordinate values for the intermediate pixel array 30A to be stored by the image control unit 60. The user then proceeds with a similar alignment procedure for the top panel 20, by depressing still yet another control key (not shown) on the test and adjustment circuit 70 that causes a signal to be generated for enabling the image control unit 60 to align the liquid crystal pixel element array 20A of the top panel 20 with the pixel element arrays 30A and 40A of the intermediate and bottom panels 30 and 40 respectively, which have now been fixed. The user proceeds with the adjustment procedure by depressing individual ones of the alignment keys to align the pixel element array of the top panel 20. Once the pixel elements of the top panel 20 have been aligned with the pixel element arrays 30A and 40A of panels 30 and 40, the user presses still yet another control key that causes the alignment coordinate values for the top pixel array 20A to be stored by the image control unit 60.

Once the pixel element array 20A, 30A, and 40A of the panels 20, 30 and 40 have been aligned, the user may cause the normal display mode of operation to be switched from an alignment mode to a scroll mode.

In the scroll mode operation, the user is able to adjust the position of the image produced by the panel construction 10 relative to the projection lens 86 and the Fresnel lens 88. In this regard, when the user depresses the scroll control switch it causes the image control unit 60 to be switched to a scroll mode. In this regard, when the user depresses various ones of the alignment keys signals are generated that are indicative of movement codes for moving the displayed image up, down, to the right, or to the left. The signals produced by the test and adjustment circuit 70 causes the image control unit 60 to adjusted the image positionally up, down, to the right or to the left in response to the received signals.

Considering now the pixel array 20A, 30A and 40A in greater detail with reference to FIGS. 3 and 4, the base pixel array 40A is arranged in a matrix of 720 by 480 individual liquid crystal pixel elements The matrix array 40A of the base panel 40 is smaller than both the top pixel array 20A and the intermediate pixel array 30A as will be explained hereinafter in greater detail.

Considering now the intermediate pixel array 30A in greater detail, the intermediate pixel array 30A is an array of 724 by 482 individual liquid crystal pixel elements that are substantially smaller than the individual liquid crystal pixel element disposed in the base array 40A. In this regard, the intermediate pixel array 30A includes an intermediate border pixel array 131 that surrounds a central area of basic pixel elements defining a central intermediate pixel array 130 arranged in a matrix of 720 by 480 pixel elements. In this regard the border array 131 includes 2 additional horizontal liquid crystal pixel elements and 2 additional vertical pixel elements The area of the base pixel array 40A normalize to a value of one is related to the central area of the intermediate pixel array 130 by the following formula:

base pixel array (40A) = a normalized area of 1.000 intermediate central pixel array 130 = 0.9945 of the normalized area.

The overall pixel array of the intermediate panel is given by the following formula:

$$\text{number of horizontal pixel in intermediate pixel array} \approx \left[1 - \frac{4}{720}\right] \text{number of horizontal pixel elements in base pixel array}$$

$$\text{number of vertical pixel in intermediate pixel array} \approx \left[1 - \frac{4}{720}\right] \text{number of vertical pixel elements in base pixel array}$$

For the foregoing it should be understood that the intermediate pixel array 30A has a central pixel array of 720 by 480 pixels that may be shifted to the right or to the left by one pixel element relative to the base pixel array 40A as well as up or down by one pixel element relative to the base pixel array 40A. This wide tolerance difference is sufficient to enable the pixel element array 30A of the intermediate panel 30 to be aligned with the base pixel array 40A for display purposes.

Considering now the top pixel array 20A in greater detail, the top pixel array 20A is a array of 726 by 484 individual liquid crystal pixel elements that are substantially smaller than the liquid crystal pixel elements disposed in either intermediate panel 30 or the base panel 40. In this regard, the top pixel array 20A includes a border pixel array 120 that surrounds a central area of basic pixel elements defining a central top pixel array 121 arranged in a matrix of 720 by 480 pixel elements. The area of the central top pixel array 121 as compared to the normalize value of the base pixel area 40A is given by the following formula:

top central pixel array (120) = 0.99167 of normalized base pixel array (40A)

The overall pixel array of the top panel 20 is given by the following formula:

$$\text{number of horizontal pixel elements in top pixel array 20} \approx \left[1 - \frac{6}{720}\right] \text{number of horizontal pixel elements in the base pixel array 40A}$$

$$\text{number of vertical pixel elements in array} \approx \left[1 - \frac{6}{720}\right] \text{number of vertical pixel elements in base pixel array 40A}$$

From the foregoing it should be understood that the top pixel array 20A has a central pixel array of 720 by 480 pixels that may be shifted to the right or to the left by three pixel elements relative to the base pixel array 40A as well as up or down by two pixel elements relative to the base pixel array 40A. Similarly with respect to the intermediate panel array 30A, the central 720 by 480 pixel array 140 of the top panel 40 may be shifted to the right or left by one pixel element as well as up or down by one pixel element. This wide tolerance difference is sufficient to enable the pixel element array 20A to be aligned with both the intermediate pixel array 30A and the base pixel array 40A simultaneously for alignment purposes Considering now the control unit 60 in greater detail with reference to FIGS. 1 and 2 the control unit 60 generally comprises a set image controller 62, 64 and 66 for controlling pixel alignment as well as the image positions on the liquid crystal panels 20, 30 and 40 respectively. In this regard, the controllers 62, 64 and 66 are coupled to the liquid crystal drive modules 22, 32 and 42 respectively for driving panels 20, 30 and 40. The drive modules 22, 32 and 42 are substantially identical to one another and are more fully described in the U.S. patent applications mentioned above. As each of the image controllers 62, 64 and 66 are substantially identical to one another only controller 62 will be described hereinafter in greater detail. It should be understood that the image controller 66 that controls the image position of the base or bottom panel 40 is used only in the scroll mode of operation as the liquid crystal pixel elements of base panel 40 are fixed and cannot be aligned positionally.

Considering now the image controller 62 in greater detail with reference to FIG. 2, the image controller 62 generally comprises a microcontroller 72 and a interface controller 74 for responding to user and technician inputs to adjust the relative position of the image displayed by panel 20. The micro controller 72 is a model 87C451 microprocessor well known to those skilled in the art and is adapted to receive signals from the infrared receiver 18 as will be described hereinafter in greater detail.

As best seen in FIG. 2, the interface controller 74 is coupled between the liquid crystal display drive module 22 and the microcontroller 72 for controlling the position of images displayed by panel 20. The interface controller 74 is a model SED1341FOE integrated circuit manufactured and sold by Seiko Epson Corporation.

Figure 6:
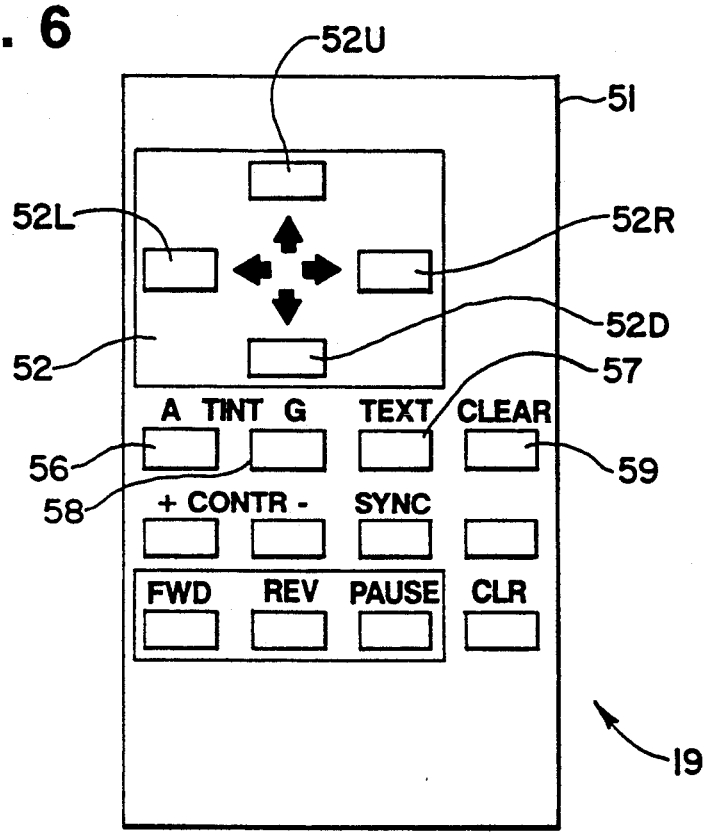
FIG. 6 is a diagrammatic view of a remotely controlled image unit of FIG. 1.

Considering now the remotely controlled image unit 19 in greater detail with reference to FIGS. 1 and 6, the image unit 19, generally comprises a housing 51 and a group of mode control switches, such as switches 56, 57, 58 and 59 that cause digital signals to be generated for switching the image control unit 60 between four different modes of operation: a normal display mode; an intermediate panel alignment mode; a top panel alignment mode; and a scrolling mode. Each of the operating modes will be described hereinafter in greater detail.

For the purpose of enabling a user to generate alignment and scrolling signals, the unit 19 also includes a direction key pad, shown generally at 52, that includes four keys: a up key 52U, a down key 52D, a right key 52R and a left key 52L. The keys 52U, 52D, 52R and 52L when depressed cause signals to be generated indicative of pixel array movement or image position movement (depending upon the mode of operation) up, down, to the right, and to the left respectively.

Considering now the various modes of operation, Table I illustrates the key strokes associated with mode conditions.

TABLE I

| Mode | Key Stroke |
| --- | --- |
| normal display mode | "clear" key (59) |
| scroll mode | "text" key (57) |
| align intermediate panel | "clear" key 59 and "R" key 56 |
| align top panel | "clear" key 59 and "G" key 58 |

In the normal display mode, the panel construction 10 responds to the video signals supplied from the personal computer for producing computer generated images. The scroll mode enables a user to scroll the computer generated image up, down, to the right or to the left for causing selected portions of the image to be repositioned on the screen 50. The alignment modes enable a user by following an alignment procedure 100 (FIG. 5) to align the pixel array 30A of the intermediate panel 30 with the pixel array 40A of the base panel 40, and the pixel array 20A of the top panel 20 with both the intermediate pixel array 30A and the base pixel array 40A simultaneously.

Figure 5:
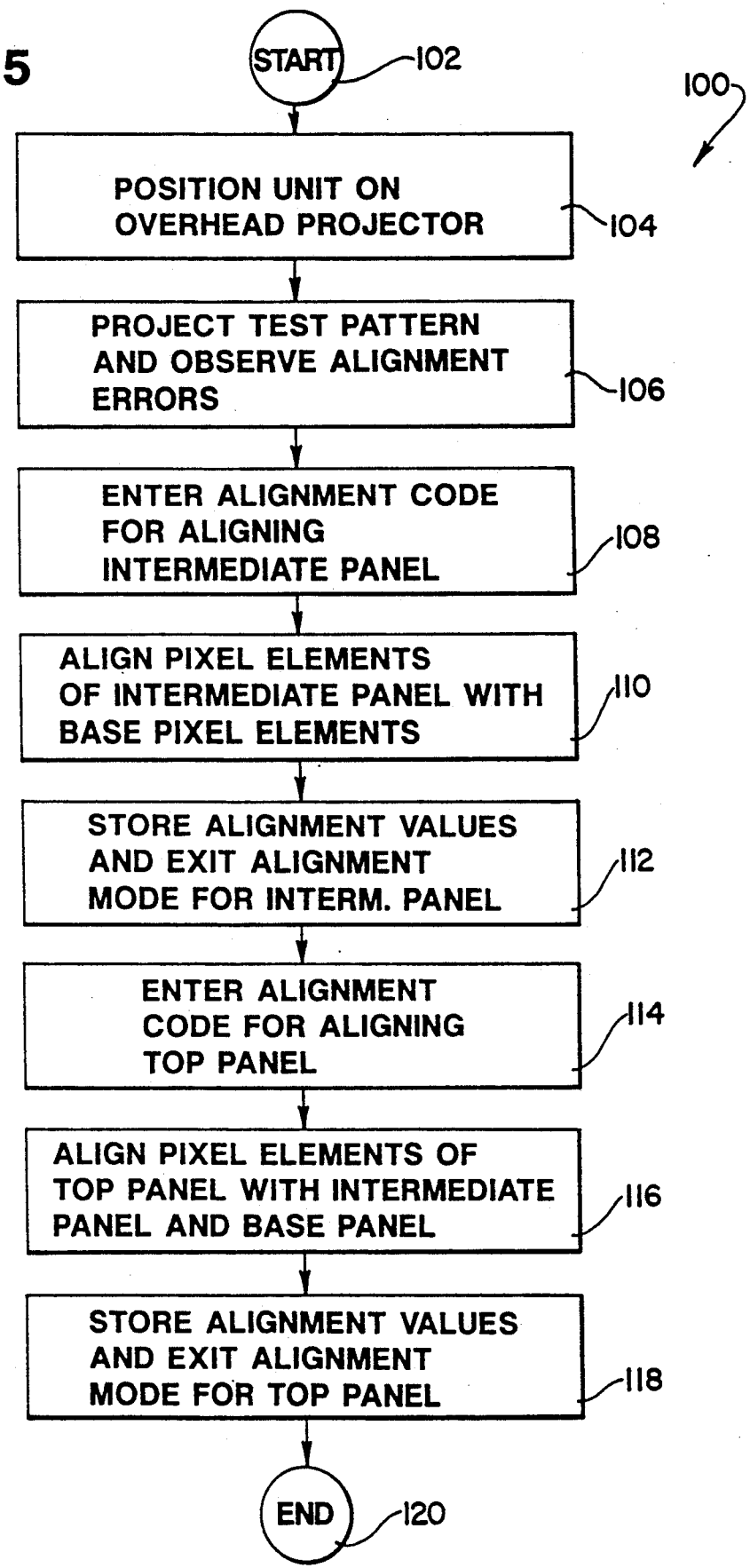
FIG. 5 is a flow chart for a pixel element alignment procedure.

Considering now the alignment procedure 100 in greater detail with reference to FIGS. 5 and 6, a user starts the alignment procedure 100 at box 102 and continues to box 104 by positioning the display assembly 16 on the stage 80 of the overhead projector 14 and observes that the images produced by the panels 20, 30 and 40 are generally displayed on the screen 50. The procedure then continues at box 106 where the user cause the personal computer to generate an alignment test pattern which is reproduced by the panels 20, and 40 and projected onto the screen 50 by the overhead projector 14.

The user at box 106 observes the test pattern on the screen 50 to visually determine whether the liquid crystal pixel elements of panels 20, 30 and 40 are properly aligned. If the pixel elements are properly aligned the user ends the procedure. If the pixels elements are not aligned the procedure continues at box 108 where the user enters a digital code for aligning the pixel element array 30A of the intermediate panel 30 with the pixel element array 40A of the base panel 40. In this regard, the user depresses keys 56 and 59 of the remotely controlled unit 19 simultaneously to cause a signal to be generated that is indicative of the alignment code for the intermediate panel 40. In response to receiving the alignment code, the image control unit 60 switches to the intermediate panel alignment mode. The user then continues with the procedure at box 110, where the user using the alignment keys, shown generally at 52, observes the displayed test pattern and adjusts the pixel element array 30A of the intermediate panel 30 so that 720 by 480 pixel elements in its 723 by 482 pixel array aligns with the 720 by 480 pixel element array 40A in the base panel 40.

After the user has made the necessary adjustments, the user continues the procedure at box 112 where the user again depresses keys 56 and 59 simultaneously to cause the offset adjustment values previously entered by the user to be stored in the microcontroller 72. Depressing keys 56 and 59 also restores the image control unit 60 to the normal display operating mode.

The user then again observes the displayed test pattern to determine whether further adjustments in pixel alignment is required. If further adjustments are not required the procedure ends. If further adjustments are required the procedure continues at box 114 where the user enters an digital code for aligning the pixel element array 20A of the top panel 20 with the pixel element arrays 30A and 40A of the panels 30 and 40 respectively. In this regard, the user depresses keys 58 and 59 on the unit 19 which causes a signal to be generated indicative of the alignment code for the top panel 20. After the image control unit 60 has switches to the top panel alignment mode, the procedure continues at box 116. At box 116 the user using the alignment keys, shown generally at 52, once again observes the displayed test pattern on screen 50, and adjust the pixel element array 20A of the top panel 20 so that a 720 by 480 pixel element array in its 726 by 486 pixel array aligns with the pixel arrays 30A and 40A of panels 30 and 40 respectively.

After the user has made the necessary adjustments, the procedure continues at box 118 where the user again depresses switches 58 and 59 simultaneously, to cause the offset values previously entered by the user for the top panel 20 pixel array 20A to be stored in the microprocessor 72. Depressing keys 58 and 59 also restores the image control unit 60 to its normal operating mode.

The user then again observes the displayed test pattern to determine whether further adjusts in pixel alignment is required. As the adjustment should be completed the procedure ends at box 120.

Figure 7:
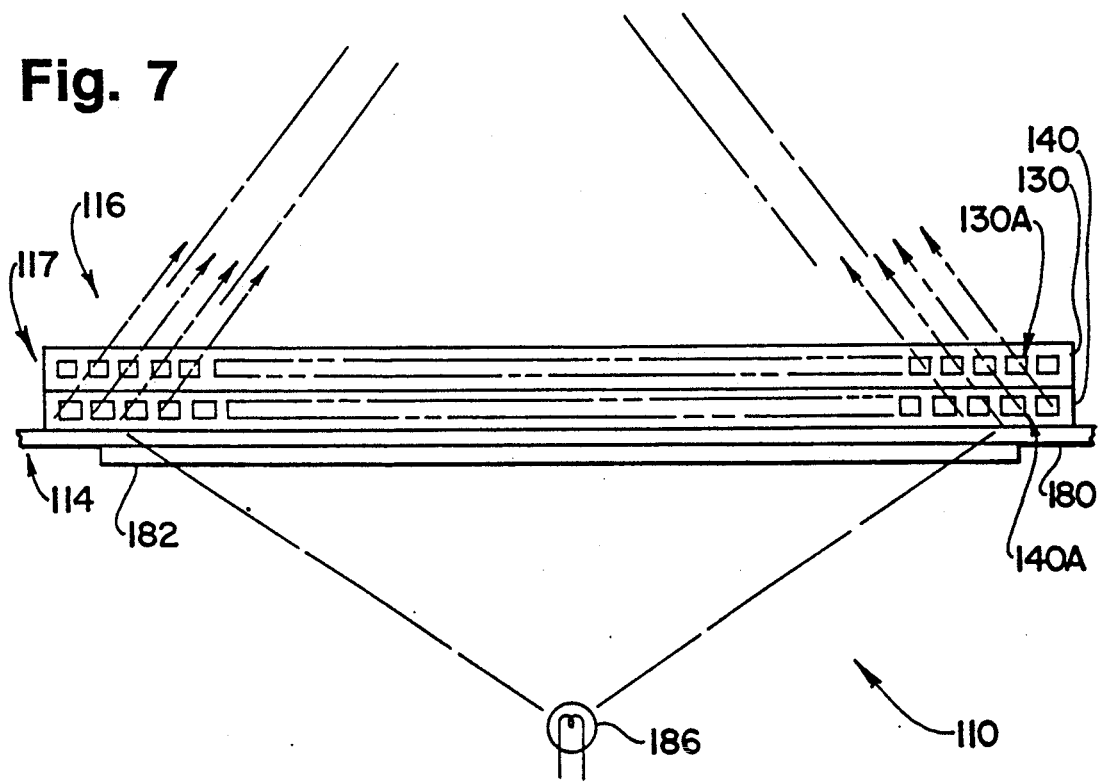
FIG. 7 is a diagrammatic view of another display panel construction which is also constructed in accordance with the present invention, and which is illustrated positioned on the platform of an overhead projector.

Referring now to the drawings, and more particularly to FIG. 7, there is shown another display panel construction 110 which is constructed in accordance with the present invention and which is adapted for use with an overhead projector 114. The projector 114 is substantially similar to projector 14 and includes a stage or transparent projection surface 180 disposed between a Fresnel lens 182 and a projection lens assembly (not shown). In this regard, the Fresnel lens 182 causes light produced by a light source 186 mounted below the stage 180 to converge onto a lens disposed in projection lens assembly.

The panel construction 110 is substantially similar to panel construction 10 except that it includes a different panel display assembly 116. In this regard, the panel assembly 116 includes a set of stacked liquid crystal panel units including a top liquid crystal panel unit 130, and a base liquid crystal panel unit 140. Each of the panel units 130 and 140 respectively are mounted in a housing 117 adapted to be positioned on the stage 180 of the overhead projector 114 and forming part of the display assembly 116.

The panel unit 130 and 140 respectively each has an array of liquid crystal pixel elements, similar to panels 30 and 40. For the purpose of enabling the converging light emerging from the Fresnel lens 182 of the overhead projector 114 to simultaneously illuminate a corresponding full pixel array in each of the panel units 130 and 140 respectively, the pixel element arrays 130A and 140A are configured differently. In this regard, the top panel 130 has a top pixel array of 724×482 liquid crystal pixel and the base panel 140 has a base pixel array of 720×480 liquid crystal pixel element. From the foregoing it should be understood that the top panel 130 has a larger number of liquid crystal pixel elements than the bottom or base liquid panel 140. Thus, the corresponding individual liquid crystal pixel elements between panels 130 and 140 are staggered and aligned along a certain angular axis.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A display apparatus comprising:
   stacked liquid crystal display units, said stacked liquid crystal display units including top, intermediate and base liquid crystal display units, said base liquid crystal display unit having a base group of liquid crystal pixel elements arranged in rows and columns defining a base pixel element array; said intermediate liquid crystal display unit having an intermediate group of liquid crystal pixel elements arranged in rows and columns defining an intermediate pixel element array; said intermediate pixel element array including an intermediate central pixel array having a same number of rows and columns as said base group but occupying a substantially smaller area than either said base group or said intermediate group; said top liquid crystal display unit having a top group of liquid crystal pixel elements arranged in rows and columns defining a top pixel element array; said top pixel element array including a top central pixel array having a same number of rows and columns as said base group but occupying a substantially smaller area than said either base group or said intermediate group or said top group; said base liquid crystal unit, said intermediate liquid crystal unit, and said top liquid crystal unit each having different pixel element sizes;
   intermediate means for aligning optically a base group of pixel images produced by said base group of pixel elements with an intermediate group of pixel images produced by a selected group of the pixel elements in said intermediate pixel array to merge the base group of pixel images and said intermediate group of pixel images; and
   top means for aligning optically said intermediate group of pixel images with a top group of pixel images produced by a selected group of the pixel elements in said top pixel array to merge the intermediate group of pixel images and said top group of pixel images.

2. A apparatus according to claim 1, further comprising:
   means for generating signals indicative of adjusted image positions of the intermediate and top units; and
   means for supplying said signals to said intermediate and top means to cause them to move adjustably the overall images of the intermediate and top images adjustably for optical alignment purposes.

3. A display apparatus according to claim 1, wherein said base pixel array produces a base image A, where A defines the area of said base image.

4. A display apparatus according to claim 3, wherein said intermediate pixel array produces an intermediate image having an area of about 0.9945A.

5. A display apparatus according to claim 3, wherein said top pixel array produces a top image having an area of about 0.9916A.

6. A display apparatus according to claim 1, wherein said base pixel array is a 720×480 pixel array.

7. A display apparatus according to claim 6 wherein said intermediate pixel array is a 724 by 482 pixel array.

8. A display apparatus according to claim 7 wherein said top pixel array is a 726 by 484 pixel array.

9. A display apparatus according to claim 1 wherein the number of pixel elements in a horizontal row of said intermediate pixel array is greater than the number of horizontal pixel elements in said base pixel array.

10. A display apparatus according to claim 9 wherein said greater number of pixel elements is 2.

11. A display apparatus according to claim 9 wherein the number of pixel elements in a horizontal row of said top pixel array is greater than the number of horizontal pixel elements in said intermediate pixel array.

12. A display apparatus according to claim 11 wherein the greater number of pixel elements is 2.

13. A display apparatus according to claim 1 wherein the number of pixel elements in a vertical row of said intermediate pixel array is greater than the number of vertical pixel elements in said base pixel array.

14. A display apparatus according to claim 9 wherein said greater number of pixel elements is 2.

15. A display apparatus according to claim 9, wherein said number of pixel elements in a vertical row of said top pixel array is greater than the number of vertical pixel elements in said intermediate pixel array.

16. A display apparatus according to claim 11 wherein the greater number of pixel elements is 2.

17. A method for aligning pixel elements disposed in a group of stacked liquid crystal panels, comprising:

applying electrical power to the group of panels, said group having a base pixel array arranged in rows and columns in a bottom panel forming part of the group, an intermediate pixel array arranged in rows and columns in an intermediate panel forming part of the group, said intermediate array having a border array of pixel elements and a central array of pixel elements, a top pixel array arranged in rows and columns in a top panel forming part of the group, said top array having a border array of pixel elements and a central array of pixel elements;

energizing the base pixel array to form a base image;

energizing selected ones of the individual pixel elements in said intermediate pixel array to form an intermediate image;

adjusting electrically the position of said intermediate image until it aligns optically with said base image along electronically controlled optical paths;

energizing selected ones of the individual pixel elements in said top pixel array to form a top image; and adjusting electrically the position of said top image until it aligns optically with said intermediate image and said base image along the electronically controlled optical paths.

* * * * *